Patented Oct. 10, 1950

2,525,061

UNITED STATES PATENT OFFICE 2,525,061

ACCELERATED POLYMER CURING METHOD

Francis P. Baldwin, Woodbridge, N. J., assignor to Standard Oil Development Company, a corporation of Delaware No Drawing. Application December 28, 1945, Serial No. 637,776

2 Claims. (Cl. 260—79.5)

This invention relates to materials and processes for the curing of synthetic rubber substances and particularly to the use of sulfur as a curing agent with an accelerator and an activator.

The invention relates particularly to the curing or vulcanization of rubber-like interpolymers of low molecular weight olefins and diolefins. When these rubber bodies are cured with sulfur and conventional accelerators, they yield cured products which are of good strength, excellent elongation, excellent flexure resistance, excellent abrasion resistance and many other valuable properties.

Usually, an activator or promoter of vulcanization, in addition to the accelerator, is required to effect the desired cure. The material most commonly used for this purpose is a metallic oxide, particularly zinc oxide. For some purposes, the use of zinc oxide is undesirable. For example, when a transparent or translucent rubber-like product is desired the zinc oxide would be unsuitable, since it imparts an appreciable amount of opaqueness to the product. Also, rubber-like products produced with the use of zinc oxide do not have sufficiently good dielectric properties for some purposes as, for example, when employed in connection with high frequency electric current circuits.

According to the present invention, it has been found that aromatic nitro compounds are very satisfactory as activators for the vulcanization of synthetic rubbers of the type described, and their use makes possible the production of a transparent product when desired, and the products are excellent insulators for high frequency electric circuits. Although the invention applies particularly to the vulcanization of synthetic rubbers by the use of sulfur as the vulcanizing agent, good vulcanization may be accomplished without the use of sulfur by employing accelerators of the thiuram and dithiocarbamate type with the aromatic nitro compounds as activators.

Thus, an object of the invention is to cure a synthetic rubber-like body by the application thereto of a curing agent having associated therewith at least an aromatic nitro compound and a vulcanization accelerator. The curing or vulcanizing agent may be separate from the accelerator or the curing and accelerating agents may be contained in the same compound.

The primary raw material for the production of a synthetic rubber-like product of the present invention is the product of the interlopymerization of a polymerizable olefin of not more than 3 carbon atoms and a diolefin of 4 to 14 carbon atoms per molecule. More particularly, the invention applies to the low temperature interpolymer of isobutylene and a diolefin.

The low temperature interpolymer is customarily prepared by a low temperature catalysis. The raw material for this polymer preferably consists of a major proportion of isobutylene with a minor proportion of a polyolefin such as butadiene, isoprene, piperylene, dimethyl butadiene, dimethallyl, myrcene, or the like, substantially any of the polyolefins having from 4 to 12 or 14 carbon atoms per molecule being usable. The preferred proportions range from 70 parts of isobutylene with 30 parts of the diolefin to 99.5 parts of isobutylene with 0.5 part of the polyolefin. The mixture is cooled to a temperature within the range between approximately $-20$ and $-165°$ C., the preferred range being between $-50$ and $-100°$ C. The cooling may be obtained by a refrigerating jacket on the storage container or polymerization reactor, or by the admixture into the olefinic material of a carbonaceous refrigerant. For internal refrigerant of this type, such substances as liquid ethylene, liquid propene, solid or liquid carbon dioxide, liquid propane, and the like are particularly useful. Other substances such as liquid methane under pressure, if desired, or liquid butane under vacuum, if desired, are also usable.

The cold mixture is polymerized by the application thereto of a Friedel-Crafts catalyst of a type depending upon the particular olefin to be polymerized. The preferred catalyst is a solution of a Friedel-Crafts catalyst such as aluminum chloride in solution in a low-freezing, non-complex-forming solvent such as ethyl or methyl chloride or carbon disulfide, or the like.

The Friedel-Crafts catalyst may be substantially any of the substances disclosed by N. O. Calloway in his article on the "Friedel-Crafts Synthesis" printed in the issue of "Chemical Reviews" published for the American Chemical Society at Baltimore in 1935, in volume XVII, No. 3, the article beginning on page 327, the list being particularly well shown on page 375. The catalyst may be a simple salt or may be one or another of a wide range of double salts depending upon the solvent it is desired to use, and the rate of speed at which the polymerization is to occur.

The catalyst solvent depends to a considerable extent upon the choice of metal halide to be used. If the metal halide is to be aluminum chloride, the preferred solvent is ethyl or methyl, mono- or polyhalide, usually the chloride, or carbon disulfide, or the like, the only limitation being that the material have a freezing point below 0° C. in order to allow the catalyst salt and catalyst solvent to dissolve in the mixed polymerizate. If the catalyst salt is to be aluminum bromide or a mixed salt, a hydrocarbon solvent is useful, including such substances as pentane, butane, propane, or ethane; liquid methane being usable, but less suitable because of its low boiling point, and hexane, heptane and octane being usable but less suitable because of their higher boiling points and the difficulty of removing them from the finished polymer. With a limited number of the higher polyolefins, gaseous boron trifluoride also may be used, particularly with dimethyl butadiene as the polyolefin. Preferably, however, the boron trifluoride is used in solution, either in liquid ethane or liquid propane or liquid butane.

The polymerization step is conveniently carried out either in successive batches or in a continuous process. In either event, the catalyst is desirably added to the polymerizate under conditions of high turbulence such as by application of the catalyst in the form of a fine spray onto the surface of the rapidly stirred olefinic mixture, or by delivery in the form of a fine jet under high pressure into a turbulence zone in the neighborhood of a high speed stirrer, or in other analogous ways which will be obvious to those skilled in the art.

The polymerization proceeds rapidly to yield a high-grade solid polymer which is separated from residual quantities of unpolymerized olefins and diluent-refrigerant (if used) and brought up to room temperature. The warmed polymer is desirably milled on the open roll mill under a stream of water to remove as much as possible of the traces of catalyst and to drive out as much as possible of the unpolymerized olefinic material.

This procedure as above described is shown in greater detail in the Sparks and Thomas U. S. Patent 2,356,128, issued August 22, 1944, to which Australian Patent No. 112,875 corresponds.

In all of these polymers, an essential component is a polyolefin having from 4 to 12 or 14 carbon atoms per molecule, which may be conjugated or non-conjugated, and may have two or more double linkages.

In practicing the present invention the polymer is compounded with appropriate fillers, lubricants, and the like, and with the curing agent preferably consisting of a portion of sulfur with an appropriate vulcanization accelerator and a portion of an aromatic nitro compound. With the sulfur, representative vulcanization accelerators are tetramethyl thiuram disulfide, 2-mercaptobenzothiazole, benzothiazole-2-monocyclohexyl sulfenamide, 2,2'-benzothiazyl disulfide, and tributylidene aniline. The ultra accelerators of the thiuram and dithiocarbamate type are particularly preferred. For the aromatic nitro compound, the most preferred substances are m-dinitrobenzene, p-dinitrobenzene, and p-nitrobenzoic acid.

The compound is conveniently prepared on the open roll mill, with the sulfur, accelerator and nitro compound added last, after the mill has been cooled to as low a temperature as possible. A compound is then placed in appropriate molds and cured at a suitable temperature for an appropriate time. Temperatures ranging from 210° F. to 425° F. are suitable, the most preferred temperatures being from 245° F. to 320° F. The preferred time of curing ranges from 5 minutes to 150 minutes depending upon the temperature and the curing agent mixture used. The sulfur is preferably used in finely divided form such as flowers of sulfur.

The aromatic nitro compounds which are used as activators of vulcanization in accordance with the present invention include any compounds having at least one nitro group attached to an aromatic hydrocarbon nucleus. The nucleus may be a single benzene nucleus or it may be a multiple nucleus as in diphenyl, or it may be a condensed ring nucleus, as in the case of naphthalene. In addition to the nitro group or groups attached to the aromatic nucleus there may be other substituent atoms or groups attached to the ring, such as halogen atoms, hydroxyl groups, alkoxy groups, amino groups, carboxyl groups, alkyl groups, and the like. Among specific compounds which have been found to be useful in accordance with this invention may be mentioned the following: nitrobenzene, m-dinitrobenzene, p-dinitrobenzene, o-nitroaniline, m-nitroaniline, p-nitroaniline, 4-nitro-2-aminotoluene, p-nitrobenzoic acid, 2,4-dinitrophenol, p-nitrochlorbenzene, p-nitrodiphenyl, o-nitroanisole, and p-nitroanisole.

In the examples which follow are given data on the properties of synthetic rubber products obtained by the use of curing ingredients in accordance with the present invention.

EXAMPLE 1

A polymer was prepared by polymerizing a mixture consisting of 97.5 parts of isobutylene of 99% purity with 2.5 parts of isoprene of 96% purity, at a temperature of approximately −120° C. by the application thereto of aluminum chloride in solution in methyl chloride. The resulting polymer was separated from the cold reaction liquid, brought up to room temperature, washed with water in a slurry tank, and dried to remove substantially all of the low boiling hydrocarbons and substantially all traces of residual catalyst.

The resulting polymer was then compounded according to various recipes, as indicated in the table of data, to show the effects of the more preferred types of aromatic nitro compounds as activators when used with sulfur as a vulcanizing agent and various conventional vulcanization accelerators. For comparison, recipes were prepared without an activator.

All of the compounded polymer portions were cured in a mold at 307° F. for 30 minutes, 60 minutes and 120 minutes, respectively. The cured samples were submitted to tests of tensile strength, percent ultimate elongation, and modulus at 300% elongation, and these values are shown in Tables I (a) and I (b) under each recipe in the order given. In these tables, the amounts of the various ingredients are shown as "parts per 100 parts of polymer."

Table I (a)

| | | | | | | | | |
|---|---|---|---|---|---|---|---|---|
| Copolymer | 100.0 | 100.0 | 100.0 | 100.0 | 100.0 | 100.0 | 100.0 | 100.0 |
| Carbon Black | 50.0 | 50.0 | 50.0 | 50.0 | 50.0 | 50.0 | 50.0 | 50.0 |
| Sulfur | 2.0 | 2.0 | 2.0 | 2.0 | 2.0 | 2.0 | 2.0 | 2.0 |
| Tributylidene aniline | 1.5 | | 1.5 | | 1.5 | | 1.5 | |
| 2 mercapto-benzothiazole | | 1.5 | | 1.5 | | 1.5 | | 1.50 |
| m-Dinitrobenzene | | | 2.0 | 2.0 | | | | |
| p-Dinitrobenzene | | | | | 2.0 | 2.0 | | |
| p-Nitrobenzoic acid | | | | | | | 2.0 | 2.0 |
| Tensile—Elong. Mod. at 300%: | | | | | | | | |
| Cured 30 min./307° F | No Cure | 1570—1100+ 115 | 1510—1070 125 | 1650—1030 185 | 1110—1100+ 60 | 1110—1100+ 120 | 685—1070 55 | 1080—960 50 |
| Cured 60 min./307° F | do | 1780—1030 120 | 1740—920 185 | 1980—870 260 | 1100—1100+ 145 | 1800—910 250 | 1440—930 105 | 1660—860 175 |
| Cured 120 min./307° F | do | 865—1100+ 60 | 1840—880 275 | 2040—830 340 | 1370—1050 175 | 1980—810 410 | 1890—830 270 | 1830—820 335 |

Table I (b)

| | | | | | | | | |
|---|---|---|---|---|---|---|---|---|
| Copolymer | 100.0 | 100.0 | 100.0 | 100.0 | 100.0 | 100.0 | 100.0 | 100.0 |
| Carbon Black | 50.0 | 50.0 | 50.0 | 50.0 | 50.0 | 50.0 | 50.0 | 50.0 |
| Sulfur | 2.0 | 2.0 | 2.0 | 2.0 | 2.0 | 2.0 | 2.0 | 2.0 |
| Benzothiazole-2-monocyclo hexyl sulfenamide | 1.5 | | 1.5 | | 1.5 | | 1.5 | |
| Tuads | | 1.0 | | 1.0 | | 1.0 | | 1.0 |
| m-Dinitrobenzene | | | 2.0 | 2.0 | | | | |
| p-Dinitrobenzene | | | | | 2.0 | 2.0 | | |
| p-Nitrobenzoic acid | | | | | | | 2.0 | 2.0 |
| Tensile—Elong. Mod. at 300%: | | | | | | | | |
| Cured 30 min./307° F | No Cure | No Cure | 1840—940 175 | 1990—860 270 | 1540—1100+ 150 | 1920—860 250 | 1380—1070 50 | 1640—1030 100 |
| Cured 60 min./307° F | No Cure | No Cure | 1990—830 295 | 2010—810 375 | 1830—880 245 | 2040—810 330 | 1735—880 153 | 1960—880 182 |
| Cured 120 min./307° F | No Cure | No Cure | 1970—770 340 | 1990—790 390 | 1830—740 330 | 2050—820 370 | 1830—820 310 | 2030—820 305 |

The data of Example 1 amply illustrate the usefulness of m-dinitrobenzene, p-dinitrobenzene and p-nitrobenzoic acid as activators for the curing of the copolymer with sulfur as the curing agent. Although these are the preferred nitro compounds for this purpose, many other types of aromatic nitro compounds may also be used, and further data are given in Example 2 to show such usefulness. In this example the vulcanization accelerator employed is Tuads, one of the most preferred among the conventional accelerators.

EXAMPLE 2

The polymer used in this example was prepared in the same manner as in Example 1, and samples of this polymer were compounded according to recipes which are similar to those of Example 1, except that other aromatic nitro compounds were employed. The tests applied were the same as in Example 1. The results of these tests are shown in Tables II (a) and II (b).

Table II (a)

| | | | | | |
|---|---|---|---|---|---|
| Copolymer | 100.0 | 100.0 | 100.0 | 100.0 | 100.0 |
| Carbon Black | 50.0 | 50.0 | 50.0 | 50.0 | 50.0 |
| Sulfur | 2.0 | 2.0 | 2.0 | 2.0 | 2.0 |
| Tetramethyl thiuram disulfide | 1.0 | 1.0 | 1.0 | 1.0 | 1.0 |
| Nitrobenzene | 2.0 | | | | |
| p-Nitrodiphenyl | | 2.0 | | | |
| 2,4-Dinitrophenol | | | 2.0 | | |
| o-Nitroanisole | | | | 2.0 | |
| p-Nitroanisole | | | | | 2.0 |
| Tensile—Elong. Mod. at 300%: | | | | | |
| Cured 30 min./307° F | 1660—1070 120 | 1965—1000 60 | No Cure | 1880—950 100 | 1060—1100+ 0 |
| Cured 60 min./307° F | 1370—1060 55 | 2090—1000 65 | 420—1100+ 50 | 1860—890 125 | 470—1100+ 0 |
| Cured 120 min./307° F | 1040—980 100 | 1800—1080 65 | 770—820 110 | 1900—880 190 | 205—1100+ 0 |

Table II (b)

| | | | | | |
|---|---|---|---|---|---|
| Copolymer | 100.0 | 100.0 | 100.0 | 100.0 | 100.0 |
| Carbon Black | 50.0 | 50.0 | 50.0 | 50.0 | 50.0 |
| Sulfur | 2.0 | 2.0 | 2.0 | 2.0 | 2.0 |
| Tetramethyl thiuram disulfide | 1.0 | 1.0 | 1.0 | 1.0 | 1.0 |
| p-Nitrochlorbenzene | 2.0 | | | | |
| o-Nitroaniline | | 2.0 | | | |
| p-Nitroaniline | | | 2.0 | | |
| m-Nitroaniline | | | | 2.0 | |
| 4-Nitro-2-aminotoluene | | | | | 2.0 |
| Tensile—Elong. Mod. at 300%: | | | | | |
| Cured 30 min./307° F | 1610—990 120 | 1360—1090 50 | 1030—1100+ 60 | 1570—1000 130 | 1625—1100+ 0 |
| Cured 60 min./307° F | 1590—1010 160 | 1360—1100+ 50 | 650—1090 60 | 1570—1010 105 | 1445—1100+ 0 |
| Cured 120 min./307° F | 1380—890 120 | 1110—1100 50 | 620—1100+ 60 | 1360—950 120 | 950—1100+ 0 |

EXAMPLE 3

A polymer was prepared in the same manner as in Example 1, and samples of this polymer were compounded with carbon black, tetramethyl thiuram disulfide and various nitro aromatic compounds, as shown in Table III below. In this series of tests sulfur was omitted, and the curing was affected by the presence of tetramethyl thiuram disulfide. The compounding and testing of the samples was carried out as in Examples 1 and 2, except that the curing was carried out for only one period of time, 60 minutes. The results are shown in Table III.

Table III

|  |  |  |  |  |  |  |  |
|---|---|---|---|---|---|---|---|
| Copolymer | 100.0 | 100.0 | 100.0 | 100.0 | 100.0 | 100.0 | 100.0 |
| Semi-reinforcing Furnace Black | 54.0 | 54.0 | 54.0 | 54.0 | 54.0 | 54.0 | 54.0 |
| Tetramethyl thiuram disulfide | | 3.0 | 3.0 | 3.0 | 3.0 | 3.0 | 3.0 |
| m-Dinitrobenzene | 2.0 | | 2.0 | | | | |
| p-Dinitrobenzene | | | | 2.0 | | | |
| o-Nitroaniline | | | | | 2.0 | | |
| m-Nitroaniline | | | | | | 2.0 | |
| p-Nitroaniline | | | | | | | 2.0 |
| Tensile—Elong. Mod. at 300%: Cured 60 min./307° F. | No Cure | No Cure | 1730—850 / 210 | 1500—840 / 170 | 1670—1040 / 210 | 1500—1010 / 150 | 1600—750 / 300 |

It will be noted that neither the tetramethyl thiuram disulfide nor the aromatic nitro compounds are capable by themselves of curing the copolymer, but that satisfactory cures are effected by the use of tetramethyl thiuram disulfide and a nitro compound in combination.

The data of Example 3 show that the aromatic nitro compounds of the present invention are effective in promoting the curing of the copolymer in the presence of accelerators which are themselves capable of acting also as curing agents. Beside tetramethyl thiuram disulfide, other accelerators of this type may be used, such as di-N-pentamethylene thiuram tetrasulfide, selenium diethyldithiocarbamate, and tellurium diethyl-dithiocarbamate.

While there are above described but a limited number of embodiments of the present invention, it is possible to produce still other embodiments without departing from the inventive concept herein disclosed, and it is accordingly desired that invention invention be considered as limited solely by the terms of the appended claims.

I claim:

1. An improved process for curing a synthetic solid plastic hydrocarbon low temperature interpolymer of 70 to 99.5 parts of isobutylene and 30 to 0.5 part of an aliphatic diolefin having 4 to 14 carbon atoms per molecule, inclusive, comprising the steps in combination of compounding into said interpolymer in the absence of metallic compounds, sulfur, 2-mercaptobenzothiazole, and p-dinitrobenzene and curing the resulting mixture at a temperature of 307° F. for at least sixty minutes.

2. Process according to claim 1 in which the diolefin is isoprene.

FRANCIS P. BALDWIN.

REFERENCES CITED

The following references are of record in the file of this patent:

UNITED STATES PATENTS

| Number | Name | Date |
|---|---|---|
| 2,356,128 | Thomas | Aug. 22, 1944 |
| 2,377,787 | Jones | June 5, 1945 |
| 2,382,813 | Paul | Aug. 14, 1945 |
| 2,393,321 | Haworth | Jan. 22, 1946 |
| 2,427,514 | Sterrett et al. | Sept. 16, 1947 |

FOREIGN PATENTS

| Number | Country | Date |
|---|---|---|
| 112,284 | Australia | Jan. 16, 1941 |